(12) United States Patent
Kim

(10) Patent No.: US 6,973,750 B1
(45) Date of Patent: Dec. 13, 2005

(54) FISHING ROD AND BUTT GRIP FOR SUCH RODS

(76) Inventor: Myung Kwon Kim, 336-16 Daljeon-Ri, Gapyong-Dup, Gapyong Gun, Gyeonggi Province (KR)

(*) Notice: Subject to any disclaimer, the term of this patent is extended or adjusted under 35 U.S.C. 154(b) by 0 days.

(21) Appl. No.: 10/134,342

(22) Filed: Apr. 26, 2002

(30) Foreign Application Priority Data

Nov. 27, 2001 (KR) ........................................ 2001-36504

(51) Int. Cl.[7] .......................... A01K 87/08; A01K 87/00
(52) U.S. Cl. ............................................. 43/23; 43/18.1
(58) Field of Search ........................... 43/18.1, 23, 21.2

(56) References Cited

U.S. PATENT DOCUMENTS

| | | | | |
|---|---|---|---|---|
| 4,467,548 A | * | 8/1984 | Tabor | 43/23 |
| 4,856,220 A | * | 8/1989 | Oak et al. | 43/21.2 |
| 5,259,140 A | * | 11/1993 | Epperson | 43/18.1 |
| 5,697,184 A | * | 12/1997 | Heller | 43/23 |
| 6,176,034 B1 | * | 1/2001 | Collins | 43/20 |

FOREIGN PATENT DOCUMENTS

GB    2259636 A   *   3/1993   ............. 43/18.1

* cited by examiner

Primary Examiner—Kurt Rowan
(74) Attorney, Agent, or Firm—Cha & Reiter, L.L.C.

(57) ABSTRACT

The fishing rod of this invention includes a hollow cylindrical butt pipe, and a plurality of hollow cylindrical sections sequentially jointed together to form a telescopically retractable structure jointed to the butt pipe such that the sections are sequentially retracted into the butt pipe. A tip rod is mounted to the end of the outermost one of the sections remote from the butt pipe. A butt grip is fitted over the butt pipe, and consists of a hollow cylindrical tube opened at both ends thereof. A plurality of radial support ribs are formed on the inner surface of the tube while being directed in radial directions and spaced apart from each other at regular intervals. When the butt grip is fitted over the butt pipe, the external surface of the butt pipe is brought into close contact with the inside edges of the radial support ribs. The butt grip directly transmits vital vibrations of a fish taking a bait or caught by the hook to the hand of a user holding it, thus allowing the user to have a thrilling and agreeable feeling while fishing, and doubling a user's interest in fishing.

3 Claims, 5 Drawing Sheets

FISHING ROD AND BUTT GRIP FOR SUCH RODS

BACKGROUND OF THE INVENTION

1. Field of the Invention

The present invention relates, in general, to fishing rods and, more particularly, to a butt grip for such fishing rods, which allows a fishing rod to feel light, soft and comfortable when it is grasped by a user while fishing, and directly transmits vital vibrations of a fish taking a bait or caught by the hook to the hand of a user holding it, thus allowing the user to have a thrilling and agreeable feeling while fishing, and doubling a user's interest in fishing.

2. Description of the Prior Art

As well known to those skilled in the art, fishing rods have been classified into three types: general rods without having any reels, fly rods with fly reels, and spinning rods with spinning reels. The size of fishing rods has been typically expressed by the number of joints of the rods. FIG. 1 shows the structure of a conventional general rod. As shown in the drawing, the conventional general rod comprises a butt pipe 100, the length and inner diameter of which are determined by the number of joints, and a plurality of sections 110, the number of which is determined in accordance with the number of joints. The sections 110 are gradually reduced in their inner diameters such that the innermost section near the butt pipe 100 has the largest diameter and the outermost section remote from the pipe 100 has the smallest diameter. All the sections 110 are sequentially jointed together to form a telescopically retractable structure, which is jointed to the butt pipe 100. When the fishing rod is out of use, the telescopically jointed sections 110 are fully retracted into the butt pipe 100, thus accomplishing compactness allowing a user to easily and conveniently carry or store the fishing rod. A tip rod 120 is mounted to the end of the outermost section 110, while a butt grip 130 covers the rear portion of the butt pipe 100. The end of the butt grip 130 is closed by a butt cap 140. The butt pipe 100 and the telescopically jointed sections 110 have been made of carbon, boron, or a mixture thereof.

A conventional spinning rod is shown in FIG. 2. As shown in the drawing, the conventional spinning rod has a butt pipe 100, a plurality of sections 110, a tip rod 120, and a butt grip 130. A reel seat assembly 200 is provided at a predetermined portion of the butt pipe 100, while a spinning reel 210 is removably attached to the reel seat assembly 200. A guide 220 is attached to each of the sections 110, and guides a fishline when the fishline is released from or wound on the spool of the spinning reel 210.

While fishing using such a conventional fishing rod, a user extends the telescopically jointed sections 110, and directs the extended rod to a desired position above the water's surface while holding the butt grip 130 with his hand, thus allowing the end of the tip rod 120 to be positioned above a desired fishing point. When a fish is caught by the fishhook of a general fishing rod without having any reel, a user jerks his fishing rod while holding the butt grip 130 with his hand(s), and slowly pulls the fish by raising the fishing rod to take the fish. When a fish is caught by the fishhook of a spinning rod, a user jerks his fishing rod while holding the butt grip 130 with his one hand, and slowly winds the fishline on the spool of the spinning reel 210 by rotating the handle of the reel 210 with the other hand to take the fish.

The conventional butt grip 130 of a fishing rod comprises an internal sheet 131 covering the rear portion of the butt pipe 100, and an external sheet 132 covering the internal sheet 131, regardless of the types of the rods. The internal sheet 131 is made of a cushiony sheet material, such as sponge, pulp, or cork, while the external sheet 132 is made of a light and elastic sheet material, such as a cork sheet or a grained timber sheet. The butt grip 130 is thus light in its weight, and allows the fishing rod to feel soft and comfortable when a user holds the grip 130.

The fishing rod having such a conventional butt grip 130 is advantageous in that the grip 130 allows a user while fishing to feel comfortable and convenient due to its soft, light and elastic materials. However, since the materials of the butt grip 130 are different from that of the butt pipe 100, there is a difference in the physical properties between the butt pipe 100 and the butt grip 130. Due to such a difference in the physical properties between the butt pipe 100 and the butt grip 130, vital vibration of a fish taking a bait or caught by the hook is intercepted or absorbed by the grip 130, and so the fishing rod having such a butt grip 130 does not allow the user to have a thrilling or agreeable feeling while fishing. In addition, since the internal and external sheets 131 and 132 of the butt grip 130 are directly and closely attached to each other using a bonding agent, the vital vibration of a fish taking a bait or caught by the hook is not directly transmitted to the hand of a user holding the grip 130, but is considerably absorbed by the grip 130. This reduces a user's interest in fishing.

The internal and external sheets 131 and 132 of the conventional butt grip 130 are made of materials having high shock absorption power as described above, and so the grip 130 absorbs the vital vibration of a fish twice at the two sheets 131 and 132. This reduces sensitivity of a user responding to the vital vibration of a fish while fishing.

Furthermore, the conventional butt grip 130 of a fishing rod is made of expensive materials, such as sponge, cork, or pulp, thus increasing the production cost of fishing rods. This forces users of fishing rods to pay much money for purchasing the rods.

SUMMARY OF THE INVENTION

Accordingly, the present invention has been made keeping in mind the above problems occuring in prior art, and an object of the present invention is to provide a fishing rod, which allows a fishing rod to feel light, soft and comfortable when a user grasps the butt grip of the rod while fishing.

Another object of the present invention is to provide a fishing rod, which directly transmits vital vibration of a fish taking a bait or caught by the hook to the hand of a user holding the butt grip, thus allowing the user to have a thrilling and agreeable feeling while fishing, and doubling a user's interest in fishing.

A further object of the present invention is to provide a butt grip for fishing rods, which is made of a synthetic resin capable of improving productivity of the butt grips and reducing the production cost of the grips, and thereby providing fishing rods having moderate prices.

In order to accomplish the above objects, the primary embodiment of the present invention provides a butt grip for fishing rods each consisting of a hollow cylindrical butt pipe, a plurality of hollow cylindrical sections sequentially jointed together to form a telescopically retractable structure jointed to the butt pipe such that the sections are sequentially retracted into the butt pipe, and a tip rod mounted to the end of the outermost one of the sections remote from the butt pipe, the butt grip comprising: a hollow cylindrical tube opened at first and second ends thereof; and a plurality of radial support ribs formed on the inner surface of the tube while being directed in radial directions and spaced apart from each other at regular intervals, whereby the butt grip is fitted over the butt pipe such that the external surface of the butt pipe is brought into close contact with the inside edges of the radial support ribs.

In another embodiment of this invention, the butt grip further comprises a plurality of reinforcing ribs transversely extending between the radial support ribs to reinforce the support ribs.

In a further embodiment, the butt grip comprises internal and external tubular parts concentrically arranged, with the radial support ribs axially extending in the gap between the internal and external tubular parts at regularly spaced positions while being directed in radial directions. The radial support ribs are each integrated with both the outer surface of the internal tubular body and the inner surface of the external tubular part.

According to still another embodiment of this invention, there is provided a fishing rod comprises a hollow cylindrical butt pipe, and a plurality of hollow cylindrical sections sequentially jointed together to form a telescopically retractable structure jointed to the butt pipe such that the sections are sequentially retracted into the butt pipe. A tip rod mounted to an end of an outermost one of the sections remote from the butt pipe. In order to directly transmit vital vibrations of a fish taking a bait to the user of the fishing rod, the fishing rod is provided with a butt grip at the end of the butt pipe. The butt grip includes a hollow cylindrical tube opened at first and second ends thereof, and a plurality of radial support ribs formed on an inner surface of said tube while being directed in radial directions and spaced apart from each other at regular intervals. The butt grip is fitted over said butt pipe such that an external surface of said butt pipe is brought into close contact with inside edges of said radial support ribs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
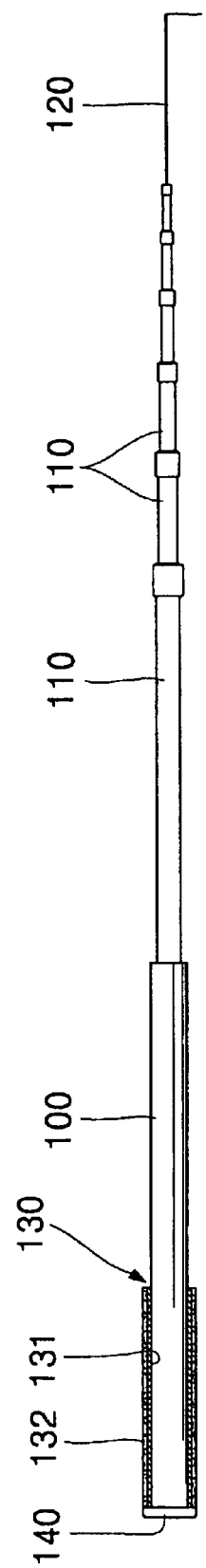
FIG. 1 is a front view of a conventional fishing rod.
Figure 2:
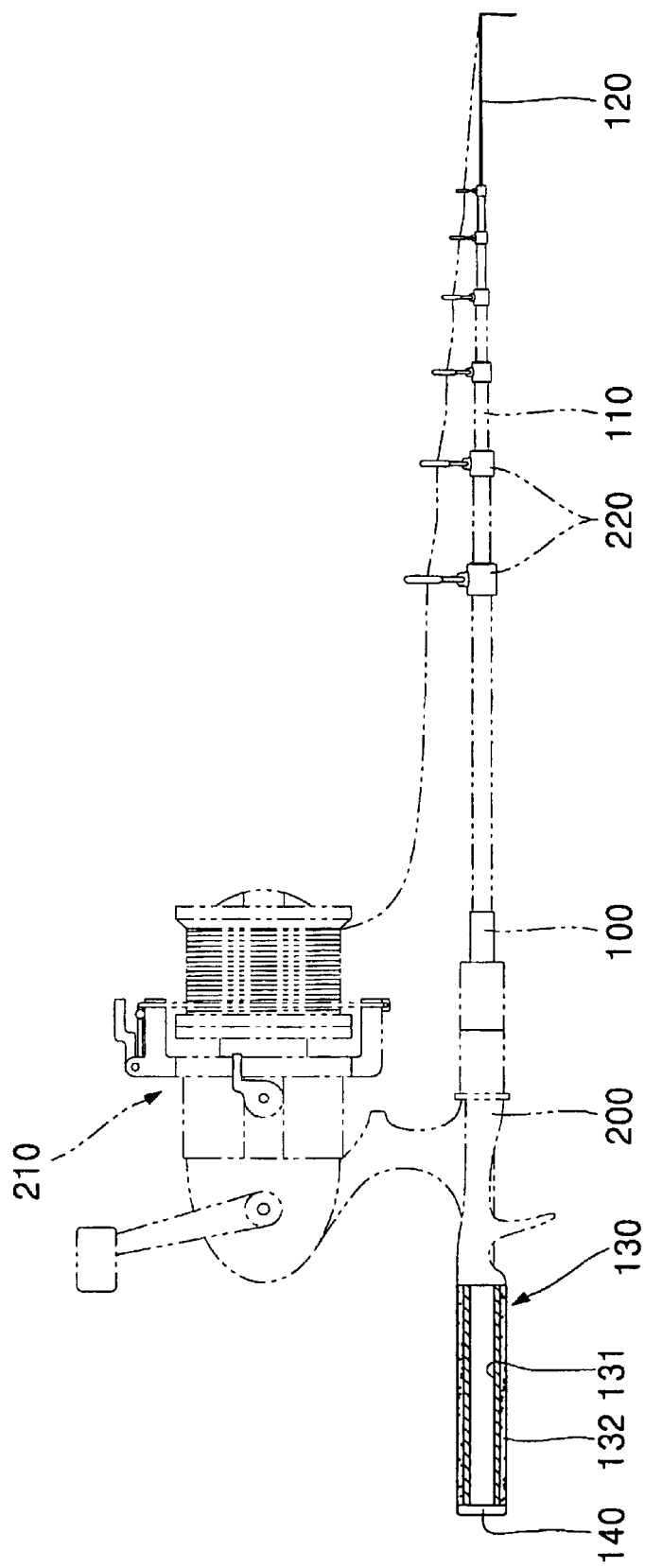
FIG. 2 is a front view of another conventional fishing rod with a spinning reel.

Reference now should be made to the drawings, in which the same reference numerals are used throughout the different drawings to designate the same or similar components.

Figure 3:
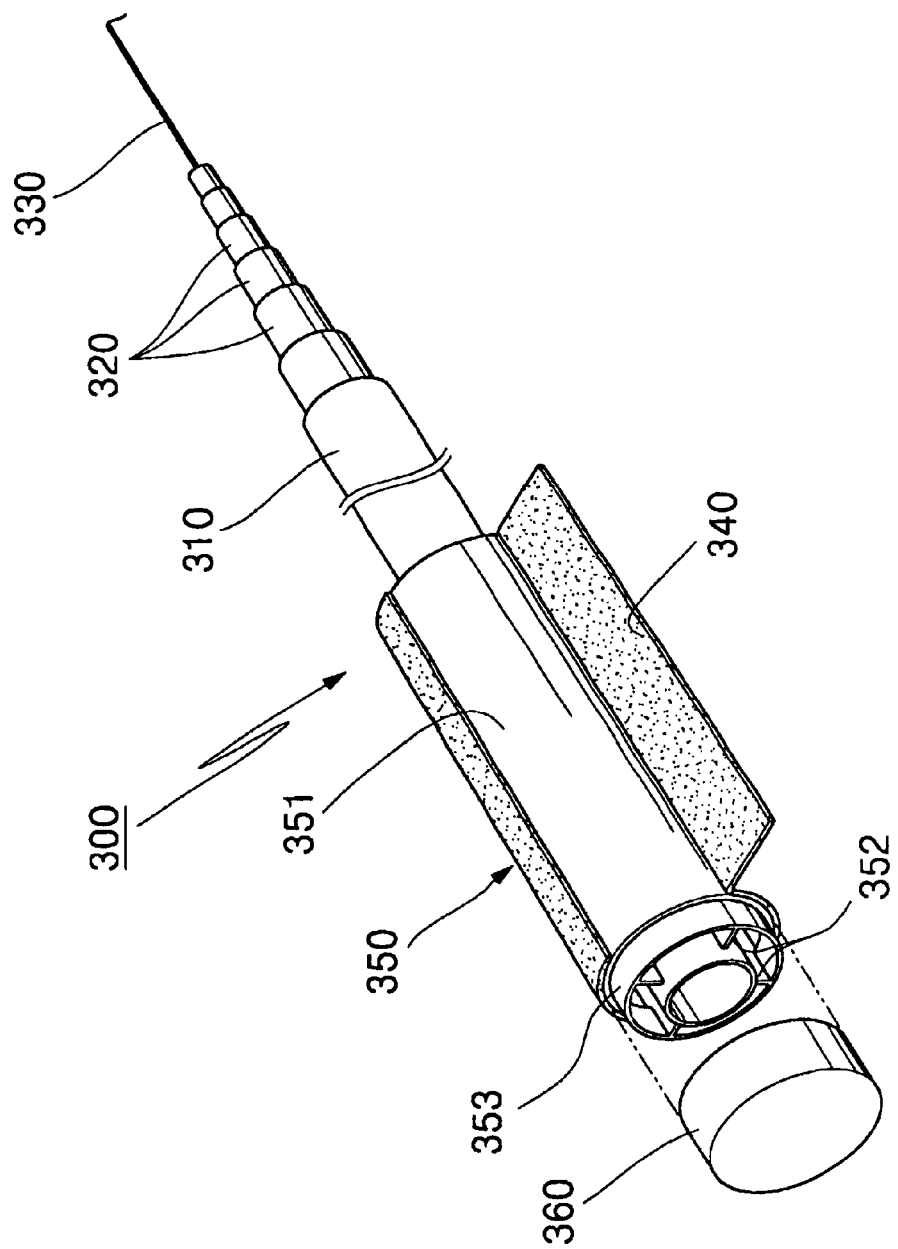
FIG. 3 is an exploded perspective view of a fishing rod in accordance with the primary embodiment of the present invention.
Figure 4:
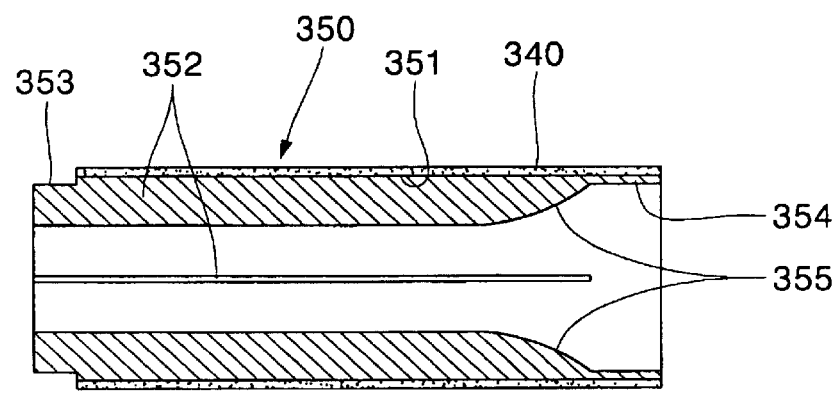
FIG. 4 is a sectional view of a butt grip of the fishing rod according to this invention.

FIG. 3 is an exploded perspective view of a fishing rod in accordance with the primary embodiment of the present invention. FIG. 4 is a sectional view of a butt grip of the fishing rod. As shown in the drawings, the fishing rod 300 of this invention comprises a hollow cylindrical butt pipe 310, the length and inner diameter of which are determined by the number of joints of the fishing rod, and a plurality of hollow cylindrical sections 320, the number of which is determined in accordance with the number of joints. The hollow sections 320 are gradually reduced in their inner diameters such that the innermost section near the butt pipe 310 has the largest diameter and the outermost section remote from the pipe 310 has the smallest diameter. All the sections 320 are sequentially jointed together to form a telescopically retractable structure, which is jointed to the butt pipe 310. When the fishing rod 300 is out of use, the telescopically jointed sections 320 are sequentially and fully retracted into the butt pipe 310, thus accomplishing compactness allowing a user to easily and conveniently carry or store the fishing rod 300. A tip rod 330 is mounted to the end of the outermost section 320, while a cylindrical butt grip 350 is provided at the end of the butt pipe 310.

The butt grip 350 is fitted over the butt pipe 310 to cover the rear portion of the pipe 310. This butt grip 350 comprises a hollow cylindrical tube 351, which is open at both ends thereof. A plurality of radial support ribs 352 are axially formed along the inner surface of the tube 351 such that the ribs 352 are directed in radial directions and spaced apart from each other at regular intervals. In such a case, the radial length of each rib 352 is determined such that a phantom cylinder formed by the inside edges of the ribs 352 is almost equal in its diameter to the outer diameter of the butt pipe 310. Therefore, when the tube 351 of the grip 350 is fitted over the butt pipe 310, the external surface of the pipe 310 is brought into close and frictional contact with the inside edges of the radial support ribs 352 of the tube 351. The first end of the tube 351 defines a female ferrule 354, while the second end of the tube 351 has a male ferrule 353. The outer diameter of the male ferrule 353 is equal to the inner diameter of the female ferrule 354. Therefore, it is possible for a user to form a butt grip with two tubes 351 coupled together as desired. That is, when a user wants to use a longer butt grip, he can make the desired longer grip by fitting the male ferrule 353 of one tube 351 into the female ferrule 354 of the other tube 351. In the tube 351, the radial support ribs 352 are each terminated by a curved end 355 at a position around the female ferrule 354. When fitting the butt pipe 310 into the butt grip 350, the curved ends 355 of the radial support ribs 352 of the grip 350 guide the end of the butt pipe 310, thus allowing the pipe 310 to be more smoothly and concentrically inserted into the butt grip 350. The external surface of the tube 351 of the butt grip 350 is covered with a shock absorbing external sheet 340, which is made of a cork sheet having a paper sheet shape. A butt cap 360 is fitted over the male ferrule 353 of the tube 351 to water-tightly seal the end of the butt grip 350.

Since the butt grip 350 of this invention is fabricated with the tube 351, it is possible to preferably use a thin cork sheet as the external sheet 340 covering the tube 351. Therefore, the butt grip 350 of this invention overcomes the problem experienced in a conventional butt grip 130, which has a double-sheet structure directly covering the butt pipe 100 and consisting of internal and external thick sheets 131 and 132 made of shock absorbing materials, and thereby excessively intercepting and absorbing vital vibrations of a fish caught by the fishhook and reducing a user's interest in fishing.

In the present invention, the tube 351 of the butt grip 350 is preferably made of a plastic material, such as PVC with high elasticity, through a plastic injection molding process.

Figure 5:
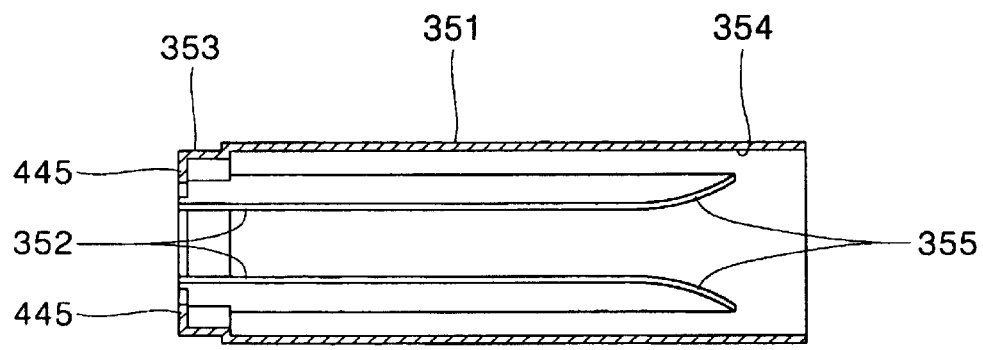
FIG. 5 is a sectional view of a butt grip of the fishing rod according to another embodiment of this invention.

FIG. 5 is a sectional view of a butt grip of the fishing rod according to the second embodiment of this invention. In the second embodiment, the general shape of the butt grip 350 remains the same as that of the primary embodiment of FIGS. 3 and 4, but a plurality of reinforcing ribs 445 transversely extend between the radial support ribs 352 to reinforce the support ribs 352. That is, the reinforcing ribs 445 are provided between the radial support ribs 352 at the end of the tube 351 near the male ferrule 353, and reinforce the support ribs 352 to prevent the ribs 352 from being deformed even when a user strongly grasps the butt grip 350 while fishing.

Figure 6:
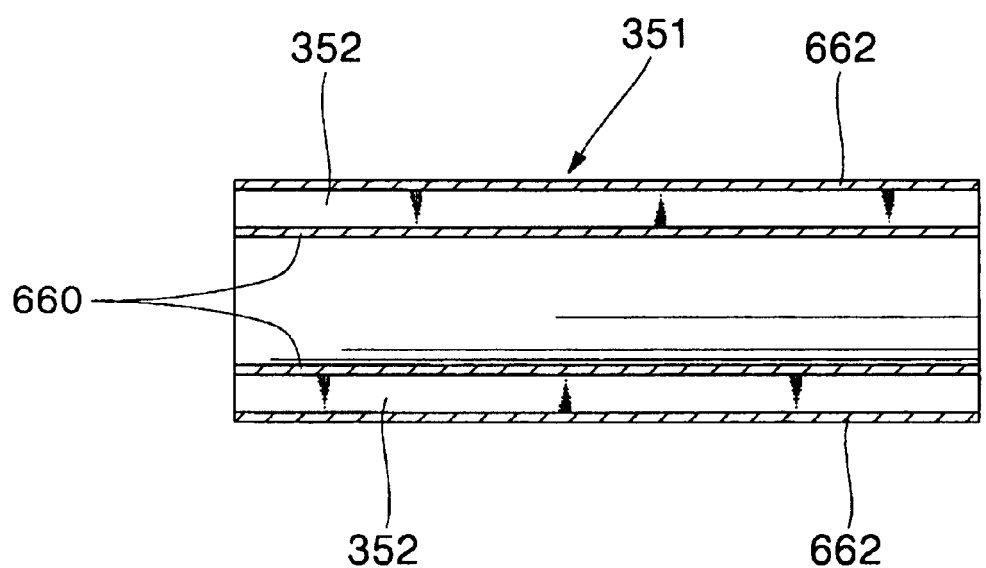
FIG. 6 is a sectional view of a butt grip of the fishing rod according to still another embodiment of this invention.

FIG. 6 is a sectional view of a butt grip of the fishing rod according to the third embodiment of this invention. In the second embodiment, the tube 351 of the butt grip 350 has a double-tube structure consisting of two tubular parts, different from the primary and second embodiments. That is, the tube 351 of the butt grip 350 comprises an internal tubular part 660 and an external tubular part 662. The two tubular parts 660 and 662 are hollow cylindrical bodies, which open at both ends thereof. The internal and external tubular parts 660 and 662 are integrated into a single structure by a plurality of radial support ribs 352 which axially extend in the gap between the internal and external tubular parts 660 and 662 at regularly spaced positions and are directed in radial directions. That is, each of the radial support ribs 352 is integrated with both the outer surface of the internal tubular body 660 and the inner surface of the external tubular part 662. In addition, the inner diameter of the internal tubular part 660 is determined such that the butt pipe 310 is closely and frictionally fitted into said tubular part 660. It is also preferable to make the internal tubular part 660 thinner than the external tubular part 662 since the structure with such different thickness of tubular parts transmits more effectively vital vibrations of a fish to the hand of a user holding the butt grip 350 while fishing.

As described above, the butt grip 350 according to the primary embodiment of this invention consists of the tube 351 having the radial support ribs 352, and is fitted over the rear end of the butt pipe 310. The radial support ribs 352 are each terminated by the curved end 355 which guides the end of the butt pipe 310 when fitting the butt pipe 310 into the butt grip 350. The butt pipe 310 is thus more smoothly and concentrically inserted into the butt grip 350. When the butt pipe 310 is fully inserted into the butt grip 350, the pipe 310 is supported in the grip 350 by the radial support ribs 352 while being concentrically spaced apart from the grip 350. An annular space is thus formed between the butt pipe 310 and the butt grip 350, which effectively transmits the vital vibrations of a fish caught by the fishhook to the hand of a user holding the grip 350.

When the butt grip 350 having the tube 351 of FIG. 5 is fitted over the rear end of the butt pipe 310, it is possible to more reliably support the butt grip 350 relative to the butt pipe 310 by the reinforcing ribs 445 of the tube 351. In the case of a fishing rod provided with the butt grip 350 having the tube 351 of FIG. 6, the internal tubular part 660 of the tube 351 is brought into close and frictional contact with the butt pipe 310. While fishing using this fishing rod, the vital vibrations of a fish caught by the fishhook are primarily transmitted from the butt pipe 310 to the internal tubular part 660, and secondarily transmitted to the external tubular part 662 through the radial support ribs 352. Therefore, the butt grip 350 of FIG. 6 is firmly supported on the butt pipe 310 even when excessively strong vital vibrations are transmitted to the grip 350 while fishing.

In the present invention, it is possible for a user to form a butt grip 350 with two tubes 351 coupled together as desired. When coupling two tubes 351 to each other into one butt grip 350, the male ferrule 353 of the first tube 351 is fitted into the female ferrule 354 of the second tube 351. In such a case, each tube 351 must have a length shorter than ½ of the length of the butt pipe 310.

When the butt grip 350 of this invention is used with a spinning rod, a reel seat assembly 200 is mounted to the butt pipe 100 prior to fitting the tube 351 of the grip 350, covered with the cork sheet 340, over the reel seat assembly 200.

In the fishing rod of this invention, a plurality of spaces are formed between the butt pipe 310 and the external sheet 340 of the butt grip 350 by the external surface of the pipe 310, the tube 351 and the radial support ribs 352 of the grip 350. In addition, the butt grip 350 according to each of the primary and second embodiments of FIGS. 3, 4 and 5 is brought into linear contact with the butt pipe 310 by the radial support ribs 352. The butt grip 350 according to the third embodiment of FIG. 6 is brought into linear contact with the butt pipe 310 by the internal tubular part 660 and the radial support ribs 352. Therefore, the vital vibrations of a fish caught by the fishhook of the fishing rod 300 is transmitted to the butt grip 350, and so a user directly feels the vital vibrations of the fish from the butt grip 350. The user thus has a thrilling and agreeable feeling while fishing, doubling his interest in fishing.

As described above, the present invention provides a butt grip for fishing rods. In the present invention, the butt grip of the fishing rod consists of a PVC tube, and a soft cork sheet covering the PVC tube. The butt grip of this invention allows the fishing rod to feel light, soft and comfortable when it is grasped by a user while fishing. The butt grip is thus convenient to the user. The butt grip directly transmits vital vibrations of a fish taking a bait or caught by the hook to the hand of a user through the tube, thus allowing the user to have a thrilling and agreeable feeling while fishing, and doubling a user's interest in fishing.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A butt grip for fishing rods each including a hollow cylindrical butt pipe, a plurality of hollow cylindrical sections sequentially jointed together to form a telescopically retractable structure jointed to the butt pipe such that the sections are sequentially retracted into the butt pipe, and a tip rod mounted to an end of an outermost one of the sections remote from the butt pipe, the butt grip comprising:

a hollow cylindrical tube opened at first and second ends thereof, wherein the first end of said hollow cylindrical tube defines a female ferrule, and the second end of the tube has a male ferrule, with an outer diameter of said male ferrule being equal to an inner diameter of said female ferrule; and a plurality of radial support ribs formed on an inner surface of said tube while being directed in radial directions and spaced apart from each other at regular intervals, whereby the butt grip is fitted over the butt pipe such that an external surface of said butt pipe is brought into close contact with inside edges of said radial support ribs.

2. The butt grip according to claim 1, wherein said radial support ribs are each terminated by a curved end at a position around a female ferrule.

3. A butt grip for fishing rods each including a hollow cylindrical butt pipe, a plurality of hollow cylindrical sections sequentially jointed together to form a telescopically retractable structure jointed to the butt pipe such that the sections are sequentially retracted into the butt pipe, and a tip rod mounted to an end of an outermost one of the sections remote from the butt pipe, the butt grip comprising:

a hollow cylindrical tube opened at first and second ends thereof, said hollow cylindrical tube further comprises a plurality of reinforcing ribs transversely extending between said radial support ribs to reinforce the support ribs; and a plurality of radial support ribs formed on an inner surface of said tube while being directed in radial directions and spaced apart from each other at regular intervals, whereby the butt grip is fitted over the butt pipe such that an external surface of said butt pipe is brought into close contact with inside edges of said radial support ribs.

* * * * *